US012050415B2

(12) United States Patent
Sasaki

(10) Patent No.: US 12,050,415 B2
(45) Date of Patent: Jul. 30, 2024

(54) REDUCING BIAS GENERATED IN INTERMEDIATE TRANSFER BELT OF AN IMAGE FORMING APPARATUS

(71) Applicant: SHARP KABUSHIKI KAISHA, Sakai (JP)

(72) Inventor: Kazuhiro Sasaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/888,391

(22) Filed: Aug. 15, 2022

(65) Prior Publication Data

US 2023/0055610 A1 Feb. 23, 2023

(30) Foreign Application Priority Data

Aug. 23, 2021 (JP) ................................. 2021-135621

(51) Int. Cl.
*G03G 15/16* (2006.01)

(52) U.S. Cl.
CPC ..... *G03G 15/1605* (2013.01); *G03G 15/1615* (2013.01)

(58) Field of Classification Search
None
See application file for complete search history.

(56) References Cited

U.S. PATENT DOCUMENTS 8,913,906 B2 * 12/2014 Suzuki ............... G03G 15/1615 198/813
11,143,988 B2 * 10/2021 Miyake .............. G03G 15/1615
2011/0188891 A1 * 8/2011 Ryu ................... G03G 15/1605 399/121

FOREIGN PATENT DOCUMENTS

JP 2011242453 A * 12/2011
JP 2015-210363 A 11/2015

OTHER PUBLICATIONS

Translation of JP-2011242453-A.*

* cited by examiner

*Primary Examiner* — Arlene Heredia
(74) *Attorney, Agent, or Firm* — ScienBiziP, P.C.

(57) ABSTRACT

An intermediate transfer belt device has an intermediate transfer belt, a drive roller that drives the intermediate transfer belt, and a pressure roller that presses from an outer surface of the intermediate transfer belt toward the drive roller. The pressure roller is disposed at a position corresponding to a downstream end in a rotating direction C in a contact region between the intermediate transfer belt and the drive roller. The intermediate transfer belt is provided in contact with the pressure roller and such that the outer surface of the intermediate transfer belt is wound around an outer surface of the pressure roller at a predetermined winding angle.

5 Claims, 9 Drawing Sheets

REDUCING BIAS GENERATED IN INTERMEDIATE TRANSFER BELT OF AN IMAGE FORMING APPARATUS

BACKGROUND OF THE INVENTION

Field of the Invention

The present disclosure relates to an intermediate transfer belt device and an image forming apparatus including the intermediate transfer belt device.

Description of the Background Art

Electrophotographic image forming apparatuses include an intermediate transfer type in which toner images are sequentially superimposed from a plurality of image bearing bodies onto an intermediate transfer belt for primary transfer, and toner images are secondarily transferred from the intermediate transfer belt to a sheet. In this type of image forming apparatus, if the intermediate transfer belt meanders, an image quality during image formation is adversely affected, and suppression of such meandering is in demand.

A drive roller that drives the intermediate transfer belt is reduced in diameter in order to improve a peeling performance of the sheet from the intermediate transfer belt in some cases. However, the drive roller with a smaller-diameter has a reduced grip on the intermediate transfer belt, making it easier for the intermediate transfer belt to slip.

For example, in a conventional technology, a pressure roller with three rollers with different outer diameters is provided on a downstream side of the process part in a travel direction of a conveyor belt and on an upstream side of two sensors that detect marks on the conveyor belt so as to press the conveyor belt against the drive roller to suppress slip is disclosed.

As disclosed in the conventional technology, even if the pressure roller is provided opposite to the drive roller in the middle part of a contact region between the drive roller and the conveyor belt with the conveyor belt between them, if the rotational shaft of each roller including the drive roller is not disposed parallel to each other, an axial force that causes the conveyor belt to be biased will occur. Therefore, even if slip can be suppressed to some extent, the conveyor belt will be still biased, resulting in a large amount of meandering of the conveyor belt.

In addition, in the case of the drive roller with a smaller diameter, influences of the drive roller's mounting angle and outer diameter tolerance becomes even greater, which can cause the intermediate transfer belt to be biased to one side easily, and there was a concern that the amount of meandering would increase.

The present disclosure was made in view of the aforementioned problems, and an object thereof is to provide an intermediate transfer belt device and an image forming apparatus that can suppress meandering of the intermediate transfer belt and enable image formation with a good image quality even if the drive roller that drives the intermediate transfer belt has a reduced diameter.

SUMMARY OF THE INVENTION

In order to achieve the aforementioned object, the intermediate transfer belt device according to the present disclosure is characterized by including an intermediate transfer belt, a drive roller which is disposed in contact with an inner surface of the intermediate transfer belt and drives the intermediate transfer belt, and a pressure member which presses the intermediate transfer belt from an outer surface of the intermediate transfer belt toward the drive roller, in which the pressure member is disposed at a position corresponding to a downstream end in a rotating direction of the intermediate transfer belt in the contact region between the intermediate transfer belt and the drive roller, and the intermediate transfer belt is provided in contact with the pressure member so that the outer surface of the intermediate transfer belt is wound around an outer surface of the pressure member at a predetermined winding angle.

More specific configurations of the above intermediate transfer belt device include the following. That is, it is preferable that the pressure member is a roller member, and the winding angle of the intermediate transfer belt to the pressure member is within 90 degrees.

In the intermediate transfer belt device of the above configuration, the pressure member is preferably a roller member and is driven to rotate via a drive gear. In that case, it is preferable that the pressure member is driven to rotate faster than the drive roller by a predetermined speed difference relative to the drive roller.

In the intermediate transfer belt device of the above configuration, it is preferable that the drive roller is rotatably supported by a support member, and the support member includes a bearing engager that engages with the bearing of the pressure member so that the rotational shaft of the pressure member and the rotational shaft of the drive roller are parallel to each other.

In the intermediate transfer belt device of the above configuration, it is preferable that the pressure member has a coating layer on the outer surface of the pressure member, the coating layer being covered by an elastic member.

An image forming apparatus having the intermediate transfer belt device including the above configuration is also within the scope of the technical concept of the present disclosure.

As a result, even if the drive roller that drives the intermediate transfer belt is reduced in diameter, meandering of the intermediate transfer belt can be suppressed, enabling image formation with a good image quality.

According to the present disclosure, even if the drive roller that drives the intermediate transfer belt is reduced in diameter, meandering of the intermediate transfer belt can be suppressed, enabling image formation with a good image quality.

DESCRIPTION OF THE PREFERRED EMBODIMENTS

An intermediate transfer belt device 20 and an image forming apparatus 1 including the intermediate transfer belt device 20 according to an embodiment of the present disclosure will be described with reference to the drawings.

Overall Configuration of Image Forming Apparatus

Figure 1:
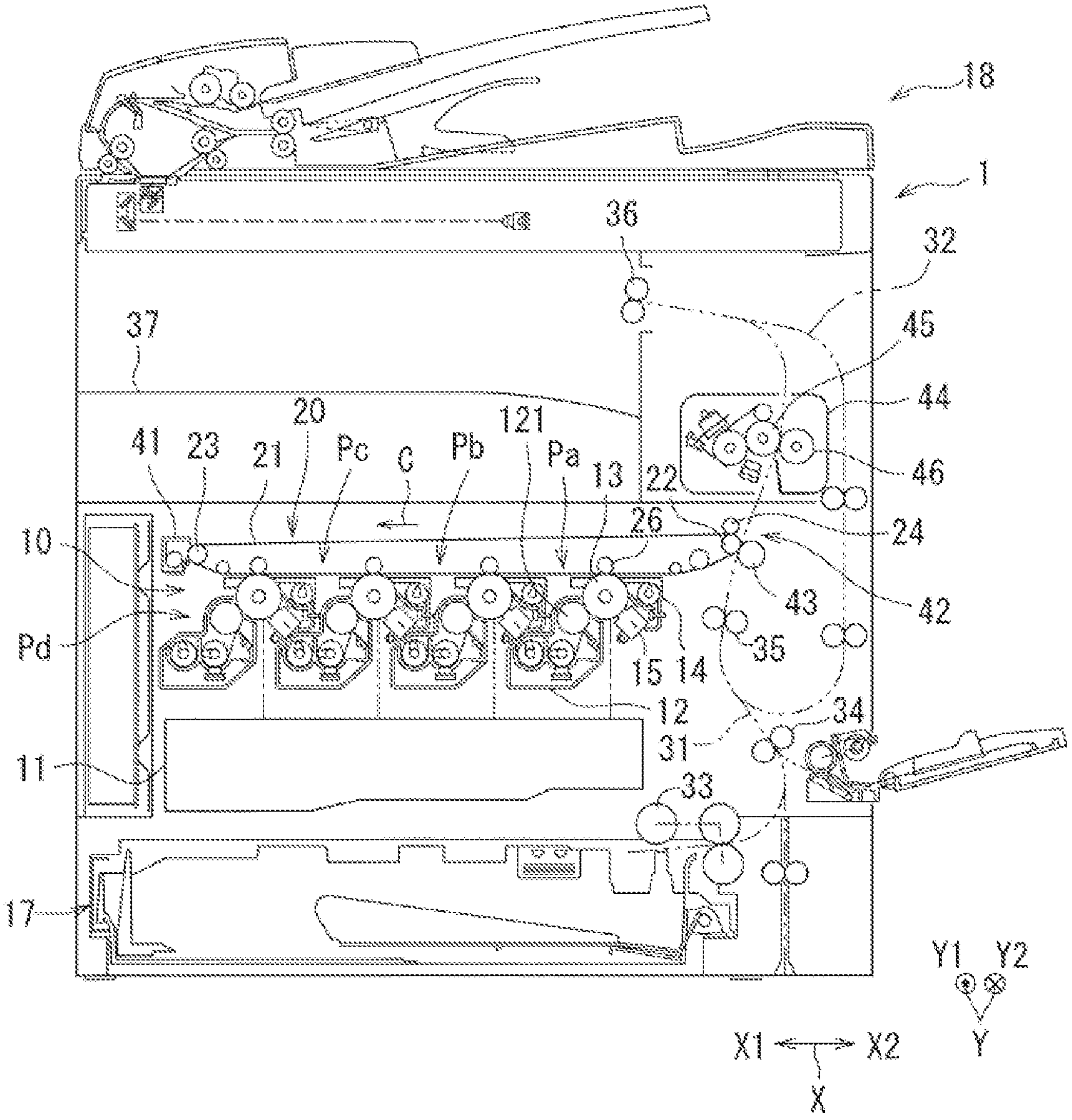
FIG. 1 is a schematic front view of an image forming apparatus according to an embodiment of the present disclosure.

FIG. 1 is a schematic front view illustrating the image forming apparatus 1 according to an embodiment of the present disclosure.

The image forming apparatus 1 is, for example, a multifunctional machine having a scanner function, a copying function, a printer function, a facsimile function and the like and transmits an image of a document read by an image reading device 18 to an outside, or forms a color or monochrome image of the read document or an image received from the outside on a sheet. This image forming apparatus 1 includes an electrostatic charging device 15, an optical scanning device 11, a developing device 12, a photosensitive drum 13, a drum cleaning device 14, a paper feeding device 17, the image reading device 18, the intermediate transfer belt device 20, a fixing device 44 and the like.

The image forming apparatus 1 handles image data according to color images using each of black (K), cyan (C), magenta (M), and yellow (Y) colors, or monochrome images using a single color (black, for example). The image reading device 18 generates the image data by reading a document or a document fed from a document conveyer (ADF). An image transferor 10 of the image forming apparatus 1 includes the developing device 12 that forms four types of toner images, the photosensitive drum 13, the drum cleaning device 14, and the charging device 15 four each, and four image stations Pa, Pb, Pc, and Pd are configured to correspond to black, cyan, magenta, and yellow, respectively.

The drum cleaning device 14 removes and collects a residual toner left on a surface of the photosensitive drum 13. The charging device 15 charges a surface of the photosensitive drum 13. The optical scanning device 11 exposes the surface of the photosensitive drum 13 so as to form an electrostatic latent image. The developing device 12 develops the electrostatic latent image on the surface of the photosensitive drum 13 so as to form the toner image on the surface of the photosensitive drum 13. Through a series of such operations, toner image in each color is formed on the surface of each photosensitive drum 13.

On an upper side of the photosensitive drum 13, the intermediate transfer belt device 20 is provided, and an intermediate transfer roller 26 is disposed through the intermediate transfer belt 21. The intermediate transfer belt 21 is an image bearing member on which the toner image is formed, is extended between a drive roller 22 and a tension roller 23, and rotates (moves circumferentially) in a direction of an arrow C. The tension roller 23 is provided to apply a predetermined tension to the intermediate transfer belt 21. The toner image in each color formed on the surface of each photosensitive drum 13 is sequentially transferred (primary transfer) onto the intermediate transfer belt 21 and superimposed so as to form a color toner image on the surface of the intermediate transfer belt 21. Detailed configuration of the intermediate transfer belt device 20 will be described later.

A secondary transfer roller 43 of a secondary transferor 42 forms a nip area (secondary transfer position) between it and the intermediate transfer belt 21, and a sheet conveyed through a sheet conveyance path 31 is sandwiched in this nip area and conveyed. As the sheet passes through the nip area, the toner image on the surface of the intermediate transfer belt 21 is transferred and conveyed to the fixing device 44. The toner and other residues on the intermediate transfer belt 21 are collected by the belt cleaning device 41.

The fixing device 44 includes a fixing roller 45 and a pressure roller 46 that rotate while sandwiching the sheet. The fixing device 44 sandwiches, between the fixing roller 45 and the pressure roller 46, the sheet on which the toner image has been transferred, heats and pressurizes the sheet, and fixes the toner image to the sheet.

The paper feeding device 17 accommodates the sheets used for image formation and is provided below the optical scanning device 11. The sheets are pulled out of the paper feeding device 17 by a pickup roller 33 and conveyed through the sheet conveyance path 31 through the secondary transferor 42 and the fixing device 44 to a paper ejection tray 37 via a paper ejection roller 36. The sheet conveyance path 31 has various roller pairs disposed such as a resist roller 35 that stops the sheet once, aligns a leading edge of the sheet, and then starts conveyance of the sheet in accordance with transfer timing of the color toner image in the nip area between the intermediate transfer belt 21 and the secondary transfer rollers 43, a plurality of conveyance rollers 34 which promote conveyance of the sheet, the paper ejection roller 36 and the like.

If image formation is to be performed not only on a front face but a back face of a sheet, the sheet is conveyed in an opposite direction from the paper ejection roller 36 to the sheet reverse conveyance path 32 so as to reverse the sheet, the sheet is guided again to the resist roller 35, the image formation is performed on the back face similarly to the front face and then the sheet is conveyed to the paper ejection tray 37.

Intermediate Transfer Belt Device

The intermediate transfer belt device 20 is an endless belt supported by main-body side frames, not shown, opposed and provided on end portion sides in a width direction of the intermediate transfer belt 21. As shown in FIG. 1, on a left side X1 and a right side X2 in a left-right direction X, the tension rollers 23 and the drive roller 22 are supported in parallel to each other. Furthermore, between the tension roller 23 and the drive roller 22, four intermediate transfer rollers 26 corresponding to each color, each of which is supported by the main-body side frames on both ends in the axial direction and disposed.

Figure 2:
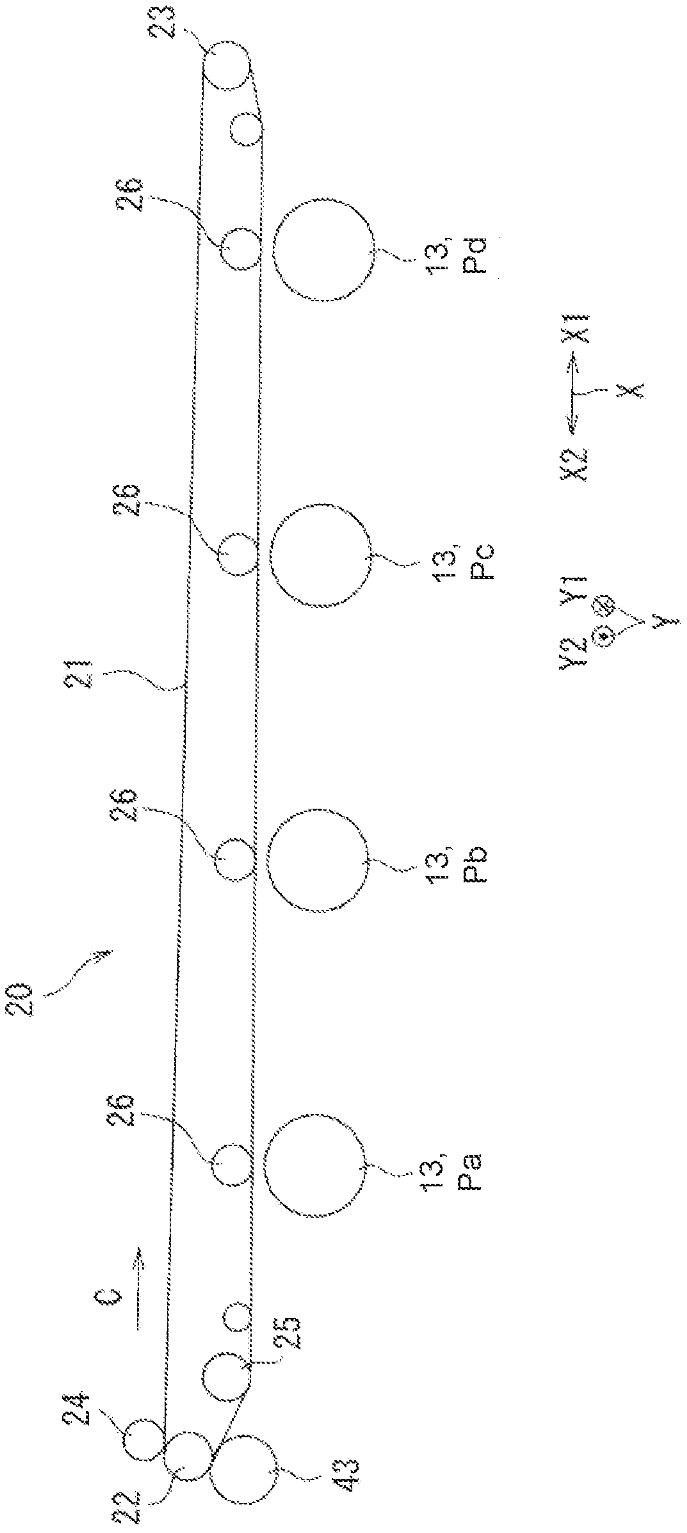
FIG. 2 is a schematic explanatory diagram of an intermediate transfer belt device (at rest) according to the embodiment of the present disclosure.
Figure 3:
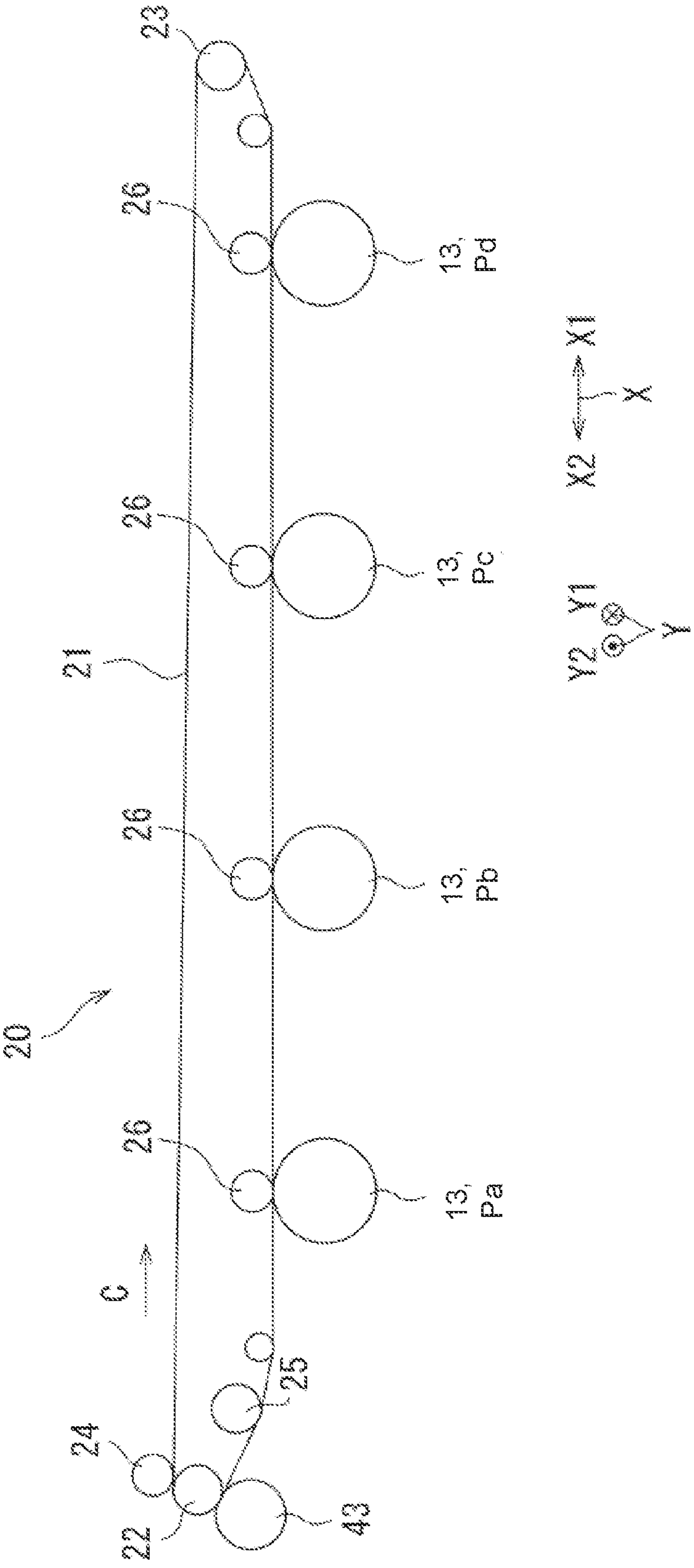
FIG. 3 is a schematic explanatory diagram of the intermediate transfer belt device (when driven) according to the embodiment of the present disclosure.

FIG. 2 and FIG. 3 are explanatory diagrams illustrating the intermediate transfer belt device 20, in which FIG. 2 shows the intermediate transfer belt 21 at rest (non-image formation) and FIG. 3 shows the intermediate transfer belt 21 when being driven (color image formation). The X direction in the figure corresponds to the left-right direction when the image forming apparatus 1 is viewed from the front (see FIG. 1), in which X1 indicates the left side and X2 indicates the right side, and the Y direction in the figure corresponds to the front-back direction when the image forming apparatus 1 is viewed from the front, in which Y1 indicates the front side and Y2 indicates the rear side. Thus, while the image forming apparatus 1 in FIG. 1 is shown as viewed from the front side Y1, FIG. 2 and FIG. 3 illustrate the states as viewed from the rear side Y2 in FIG. 1.

As shown in FIG. 2, viewed from the rear side Y2, the photosensitive drums 13 corresponding to four image stations Pa, Pb, Pc, and Pd are disposed along the outer surface of the intermediate transfer belt 21, respectively. The intermediate transfer rollers 26 are disposed at positions corresponding to each of the photosensitive drums 13 with the intermediate transfer belt 21 between them. In the illustrated form, the intermediate transfer belt 21 is disposed above the four photosensitive drums 13.

The intermediate transfer rollers 26 are provided capable of being brought into or separated from the photosensitive drums 13 to which they are opposed. As a result, the intermediate transfer roller 26 can be displaced freely between a position where it presses the intermediate transfer belt 21 against the opposing photosensitive drum 13 from the inner side and a position where it is separated away therefrom. As shown in FIG. 2, during the non-image formation, all of the intermediate transfer rollers 26 are disposed at separated-away positions, respectively, so that the intermediate transfer belts 21 are disposed at predetermined positions separated away from all the photosensitive drums 13.

In the color image forming apparatus, which is the image forming apparatus 1 shown in the illustrated form, the intermediate transfer roller 26 is configured to be displaced in accordance with each operation state during monochrome image formation, color image formation, and non-image formation. For example, the intermediate transfer belt 21 is separated away from all the photosensitive drums 13 during the non-image formation, as shown in FIG. 2, and contacts only the photosensitive drum 13 for black during the monochrome image formation. During the color image formation, as shown in FIG. 3, all the intermediate transfer rollers 26 are disposed at their pressing positions, respectively, so that the intermediate transfer belt 21 is disposed in contact with all the photosensitive drums 13.

A suspension roller 25 is disposed in the vicinity of the drive roller 22 for driving the intermediate transfer belt 21. The intermediate transfer belt 21 is wound around the drive roller 22 and the suspension roller 25 on the end portion of the right side X2. Each of the drive roller 22, the suspension roller 25, and other rollers imparts a predetermined belt tension (tension) to the intermediate transfer belt 21.

In the intermediate transfer belt device 20, a meandering correction mechanism, not shown, is provided in order to mechanically correct meandering (bias) of the intermediate transfer belt 21 occurring by a shift of parallelism of each of the rotation axes of the drive roller 21, the tension roller 23, the suspension roller 25 and the like which suspend the intermediate transfer belt 21 caused by a mounting error, a thermal expansion difference of the mounting area due to an environmental temperature change or the like. The meandering correction mechanism is provided on the tension roller 23 and includes a bias transmission member which moves along an axial direction of the tension roller 23 by a biasing force of the intermediate transfer belt 21 generated along the axial direction of the tension roller 23 (in this case, the front-back direction Y). The meandering correction mechanism is configured to automatically adjust the biasing force generated in the intermediate transfer belt 21 and to suppress the meandering of the intermediate transfer belt 21 by mechanically changing inclination of the tension roller 23 in a rotation axis direction in accordance with a movement amount in the axial direction of this bias transmission member.

In the intermediate transfer belt device 20 according to this embodiment, the drive roller 22 has a reduced diameter as compared with the conventional one, and meandering of the intermediate transfer belt 21 can occur easily. Therefore, a change amount of the inclination of the rotation axis of the tension roller 23 by the meandering correction mechanism for the meandering of the intermediate transfer belt 21 may become larger, and as a result, there is a concern that the meandering correction mechanism may become larger. Therefore, in view of characteristics of suppressing slip of the intermediate transfer belt 21 with respect to the drive roller 22 and of transmitting a rotational force to the intermediate transfer belt 21, in order to reduce a meandering amount occurring in the intermediate transfer belt 21 as much as possible in the drive roller 22 which has the greatest influence on the biasing force of the intermediate transfer belt 21, a pressure member as shown below is provided.

Pressure Member

Figure 4:
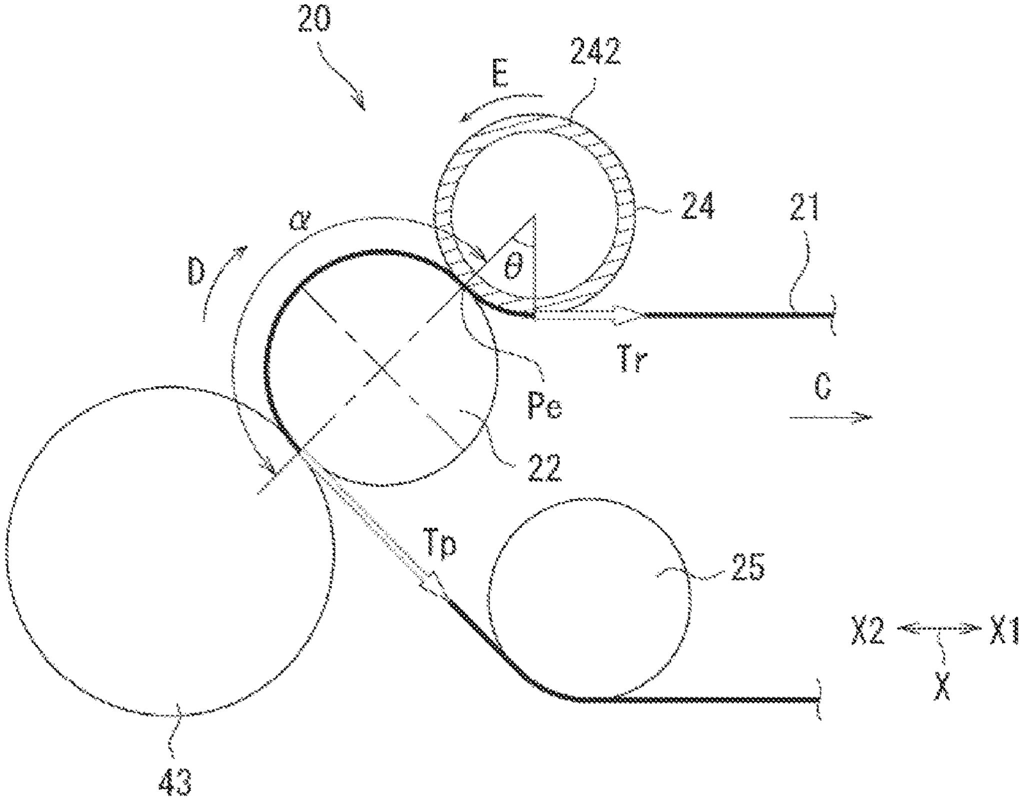
FIG. 4 is an explanatory diagram schematically illustrating a structure on a drive roller side in the intermediate transfer belt device shown in FIG. 3.

FIG. 4 is an explanatory diagram schematically illustrating a structure of the drive roller 22 side (right side X2 region) of the intermediate transfer belt device 20 shown in FIG. 3. In FIG. 4, the intermediate transfer belt 21 is configured to be circumferentially moved to a rotating direction C by rotational drive in a rotating direction D of the drive roller 22.

The intermediate transfer belt device 20 has a pressure member that presses from an outer surface of the intermediate transfer belt 21 toward the drive roller 22. As this pressure member, a pressure roller 24, which is a roller member, is provided in this embodiment.

As shown in FIG. 4, the intermediate transfer belt 21 and the drive roller 22 are provided in contact with each other in a contact region $\alpha$. The pressure roller 24 is disposed at a position corresponding to a downstream end Pe in the rotating direction C of the intermediate transfer belt 21 in the contact region $\alpha$, in contact with the outer surface of the intermediate transfer belt 21. The intermediate transfer belt 21 is provided so as to be brought into contact with the pressure roller 24, and the outer surface of this intermediate transfer belt 21 is wound around the outer surface of the pressure roller 24 at a predetermined winding angle $\theta$. The winding angle $\theta$ of the intermediate transfer belt 21 with respect to the pressure roller 24 is within 90 degrees.

A belt tension is generated in the intermediate transfer belt 21 that is in contact with the drive roller 22 in the contact region $\alpha$. Here, the belt tension in the intermediate transfer belt 21 will be described in brief.

Figure 5:
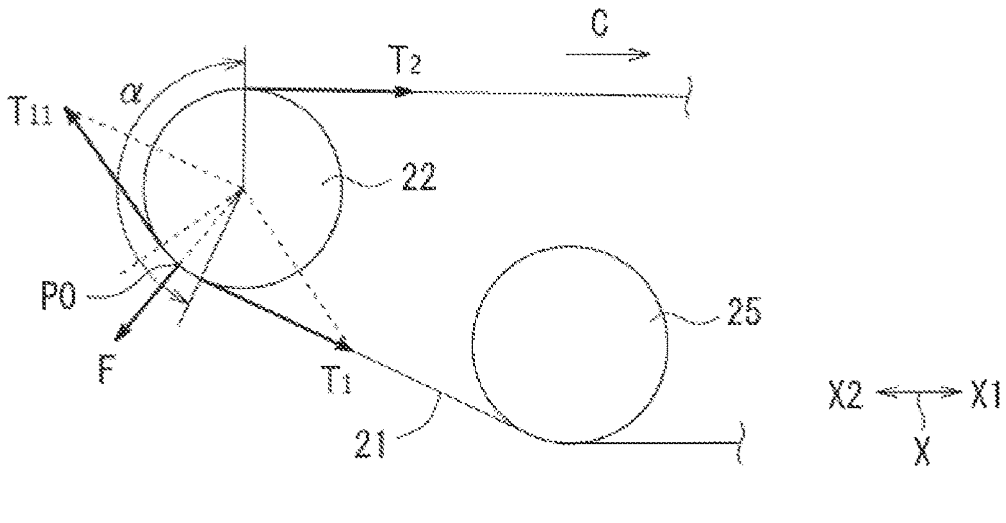
FIG. 5 is an explanatory diagram illustrating a belt tension acting on the intermediate transfer belt when it is at rest in the intermediate transfer belt device as a reference example.
Figure 6:
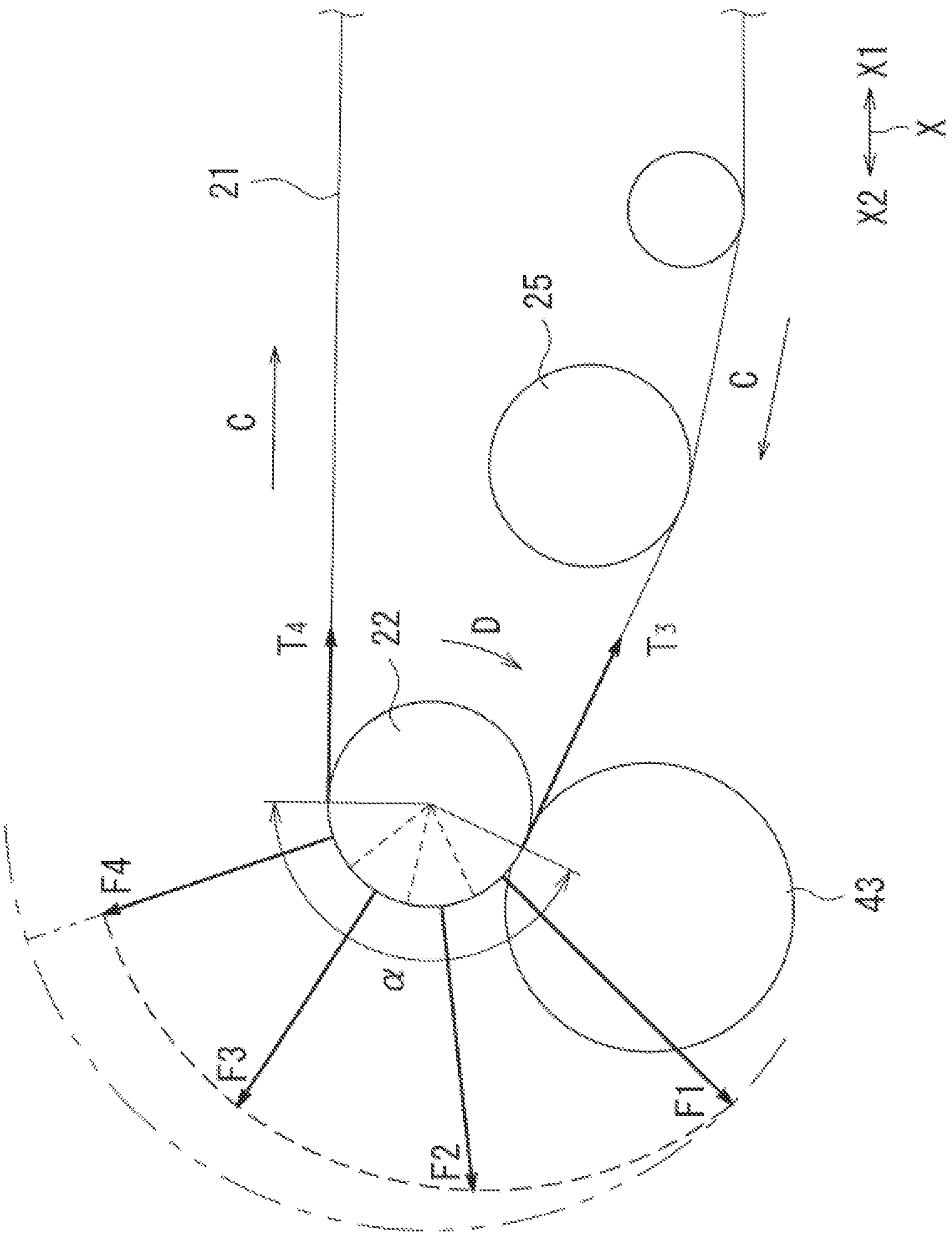
FIG. 6 is an explanatory diagram illustrating the belt tension acting on the intermediate transfer belt when it is driven in the intermediate transfer belt device as a reference example.

FIG. 5 is an explanatory diagram illustrating the belt tension acting on the intermediate transfer belt 21 when it is at rest (non-image formation) in the intermediate transfer belt device as a reference example, and FIG. 6 is an explanatory diagram illustrating the belt tension acting on the intermediate transfer belt 21 when it is being driven (image formation). In these examples, similarly to FIG. 4, a state in which the image forming apparatus 1 is viewed from the rear side Y2, and the pressure roller 24 is not provided.

When the intermediate transfer belt 21 is at rest, as shown in FIG. 5, belt tensions T1 and T2 are generated on both end parts of the contact region $\alpha$ between the intermediate transfer belt 21 and the drive roller 22 by the action of the tension roller 23. As described above, in the state where the intermediate transfer belt 21 is at rest, the belt tension T1 acting on an upstream end in the rotating direction C of the intermediate transfer belt 21 in the contact region α becomes approximately equal to the belt tension T2 acting on a downstream end in the rotating direction C. Also, when considering the intermediate transfer belt 21 of a minute length including a base point P0, a force balance relationship is formed by a force component in a tangential direction with respect to the belt tension T1 and its reaction force T11 and a force component F in a radial direction of the drive roller 22.

On the other hand, as shown in FIG. 6, when the intermediate transfer belt 21 is being driven, that is, when the drive roller 22 is rotating in a rotating direction D, a belt tension T3 acts on the upstream side in the rotating direction C in the contact region α, in which the intermediate transfer belt 21 is in contact with the drive roller 22, and a belt tension T4 acts on the downstream side in the rotating direction C, and here, it is the belt tension T4<belt tension T3. The reasons for that will be explained in the following. In the state shown in FIG. 6, as shown in FIG. 3, the photosensitive drum 13 is in contact with the intermediate transfer belt 21, opposed to the intermediate transfer roller 26, respectively, which is a rotational load. Therefore, on the upstream side in the contact region α with the drive roller 22 of the intermediate transfer belt 21, the belt tension acting on the intermediate transfer belt 21 becomes taut, while on the downstream side in the contact region α it becomes loose.

Here, if the intermediate transfer belt 21 in the contact region α is divided into four equally divided micro-length regions, for example, and the force component in the radial direction acting on each micro-length region is defined as a force component (F), each of the force component (F) gradually decreases from the upstream side to the downstream side of the contact region α under an influence of the belt tension acting on the intermediate transfer belt 21. In other words, in the contact region α, the force component F1 in the radial direction acts on the upstream side in the rotating direction C of the intermediate transfer belt 21, while and this force gradually become smaller toward the downstream side as force components F2, F3, and F4.

Figure 7:
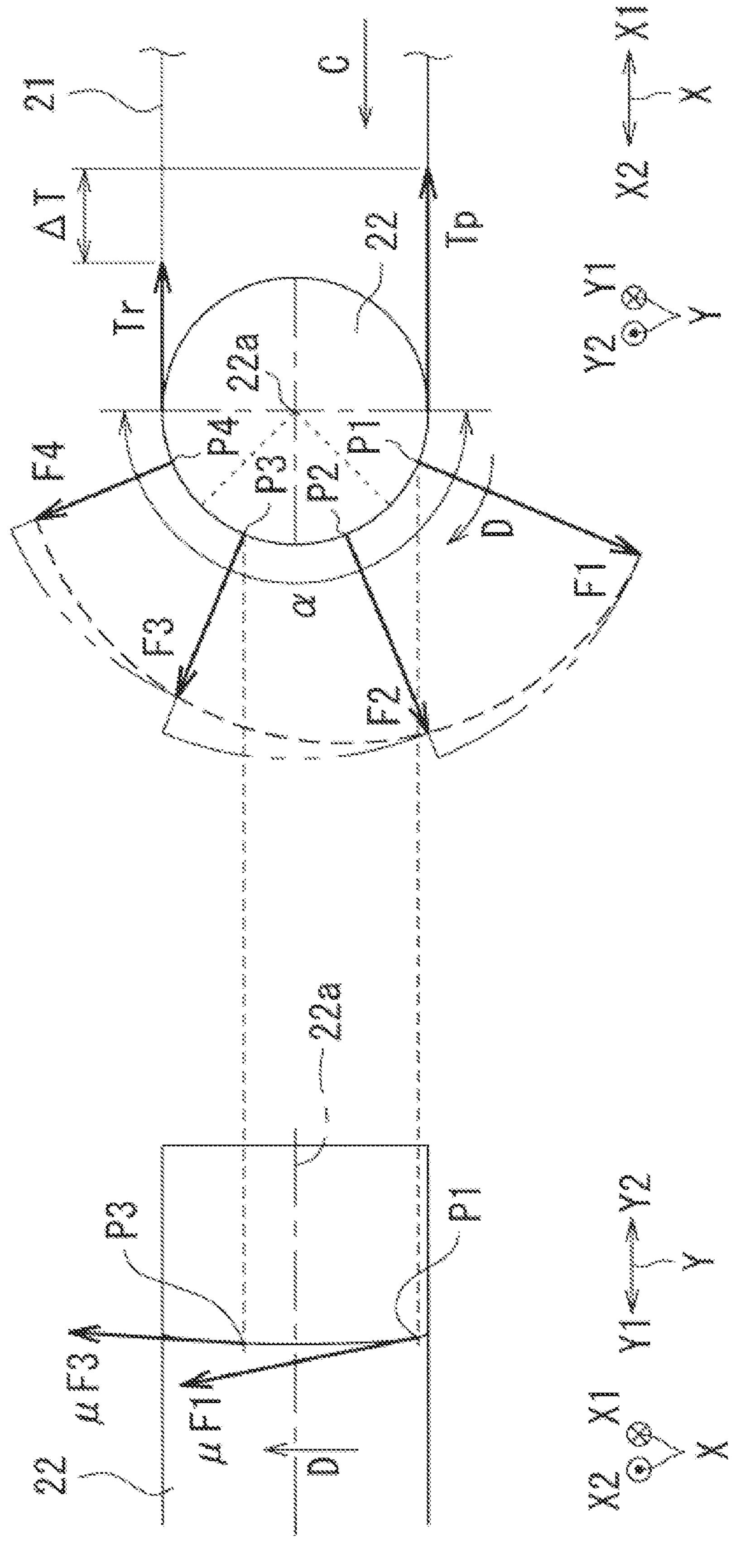
FIG. 7 is an explanatory diagram in a simplified manner illustrating the belt tension when it is driven shown in FIG. 6.

FIG. 7 is an explanatory diagram illustrating a moving direction in which the intermediate transfer belt 22 moves upon receipt of the belt tension and each force component (F) during driving shown in FIG. 6 in a simplified manner, in which the contact region α is shown as 180 degrees for simplicity. In FIG. 7, the drive roller 22 viewed from the rear side Y2 is shown on the right side in the figure, and the drive roller 22 viewed from the right side X2 is schematically shown on the left side in the figure.

As shown in the figure, a belt tension Tp acts at the upstream end in the rotating direction C of the intermediate transfer belt 21, and a belt tension Tr acts on a downstream end in the rotating direction C. The belt tension Tp at the upstream end is greater than the belt tension Tr at the downstream end only by a tension difference ΔT. The reason is that the rotational load (intermediate transfer roller 26 and photosensitive drum 13) is connected on the upstream side in the rotating direction C and thus, the intermediate transfer belt 21 is subjected to this load during the rotation.

Therefore, as described above, by considering the contact region α with a minute length divided equally by 45 degrees, the force component (F) in the radial direction acting on the intermediate transfer belt 21 becomes gradually smaller from the upstream side to the downstream side of the contact region α and becomes the force component F1, the force component F2, the force component F3, and the force component F4 in order from the upstream side in the rotating direction C. The total sum of the force component F1, the force component F2, the force component F3, and the force component F4 (the force acting on the intermediate transfer belt 22 from the drive roller 21, which is a frictional force) enables the intermediate transfer belt 21 to be driven to rotate without slipping even if the intermediate transfer rollers 26 and the photosensitive drums 13 disposed in plural on the upstream side in the rotating direction of the drive roller 21 are brought into contact with the intermediate transfer belt 21.

To be more specific, the force component F1 at a base point P1 is a frictional force μF1 (where μ is a coefficient of friction) acting between the intermediate transfer belt 21 and the drive roller 22, and the force component F3 at a base point P3 becomes a frictional force μF3. Here, if the axial direction of the rotational shaft (rotation axis 22*a*) of the drive roller 22 is not orthogonal to the left-right direction X, which is in parallel with the rotating direction C of the intermediate transfer belt 21, but is shifted, that is, in the case of disposition where the rotational shaft of the drive roller 22 is shifted to the right side X2 on the rear side Y2, for example, and to the left side X1 on the front side Y1, as shown on the left side of FIG. 7, the frictional forces (μF1, μF3) acting on the intermediate transfer belt 21 act so as to move the intermediate transfer belt 21 in a direction shifted with respect to the rotating direction D of the drive roller 22, respectively. The movement direction changes in accordance with the position of the drive roller 22 in the rotating direction D (P1, P2, P3, P4).

In other words, as shown on the left side of FIG. 7, at the base point P1, which is located on the upstream side of the rotating direction C, the frictional force μF1 does not act as a force along the rotating direction D, but acts as a force inclined to the front side Y1 direction, which is diagonal to the rotating direction D. At the base point P3, which is located on the downstream side of the rotating direction C, the frictional force μF3 acts as a force inclined to the rear side Y2 direction, which is diagonal to the rotating direction D.

The frictional force between the intermediate transfer belt 21 and the drive roller 22 generated with inclination to the rotating direction D of the drive roller 22 as above causes the intermediate transfer belt 21 to be biased. The frictional force by force components F1 and F2 on the upstream side acts in the front side Y1 direction, while the frictional force by the force components F3 and F4 on the downstream side acts in the rear side Y2 direction. In this case, the force components F1 and F2 are larger than the force components F3 and F4 and thus, are greatly affected by the frictional force in the front side Y1 direction, resulting in a bias in the front side Y1 direction.

Therefore, if the rotational shaft (rotation axis 22*a*) of the drive roller 22 is disposed even with a small shift in the disposition of the rotational shafts of the other rollers provided in the intermediate transfer belt device 20, the frictional force between the intermediate transfer belt 21 and the drive roller 22 does not follow the rotating direction D of the drive roller 22, but a shift to the front-back direction Y is generated. As a result, the intermediate transfer belt 21 is easily shifted in the front-back direction Y, causing a bias and meandering. Moreover, as shown in this embodiment, in the case where the drive roller 22 is a roller with a reduced diameter, such tendency becomes more remarkable, and the differences among the force component F1 to the force component F4 become larger, which is thought to cause the bias more easily.

In response to such a problem, the intermediate transfer belt device 20 according to this embodiment is configured, as shown in FIG. 4, such that the pressure roller 24 that presses from the outer surface of the intermediate transfer belt 21 toward the drive roller 22 is provided, whereby bias generated in the intermediate transfer belt 21 is suppressed, and the meandering amount is reduced as much as possible.

Figure 8:
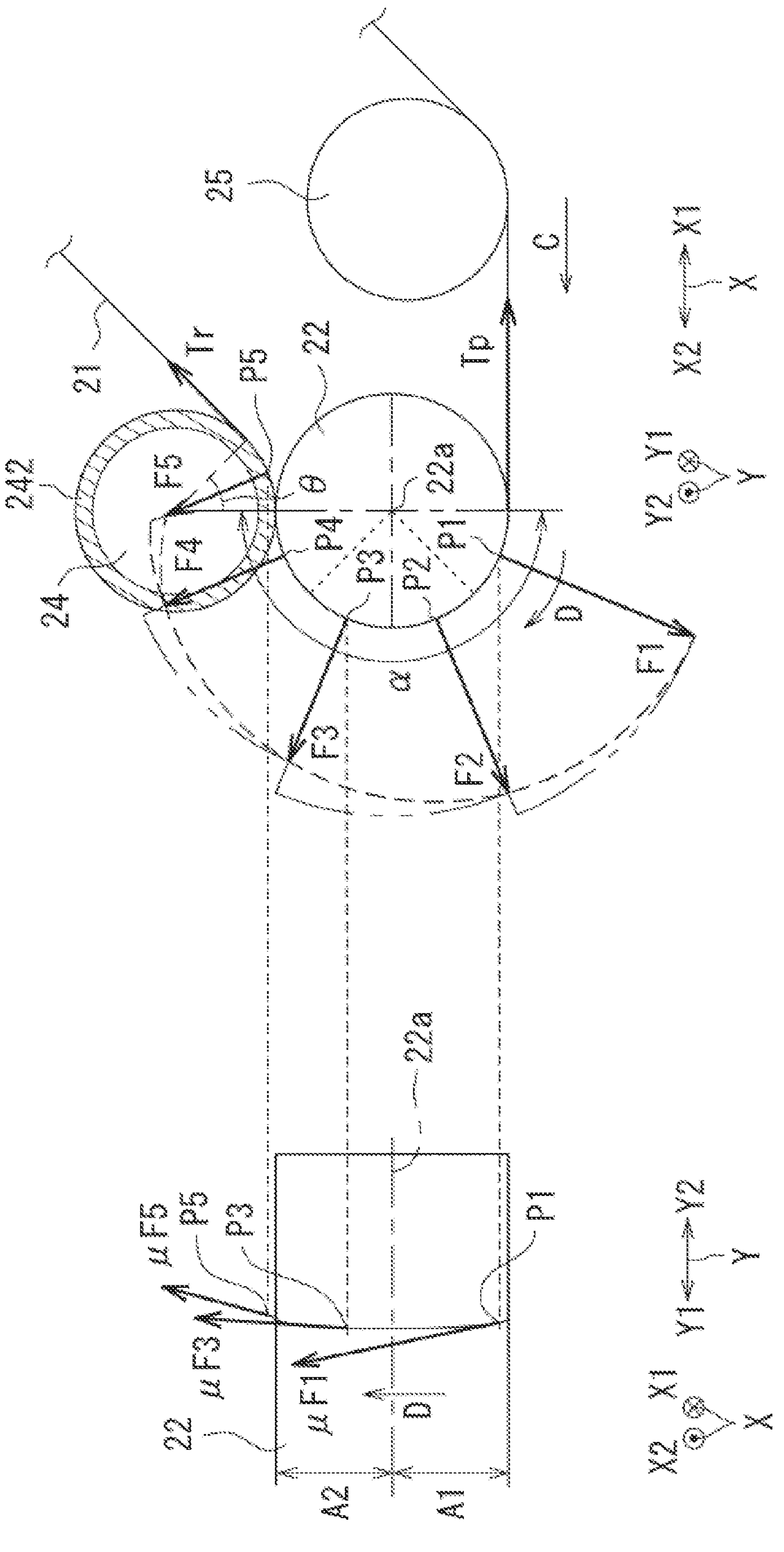
FIG. 8 is an explanatory diagram in a simplified manner illustrating the belt tension when the intermediate transfer belt is driven in the intermediate transfer belt device according to the embodiment of the present disclosure.

FIG. 8 is an explanatory diagram illustrating the belt tension during driving of the intermediate transfer belt 21 in a simplified manner in a case where the pressure roller 24 is provided and is equivalent to FIG. 7. The contact region $\alpha$ is shown as 180 degrees for simplicity. In FIG. 8, too, the right side of the figure shows the drive roller 22 viewed from the rear side Y2, and the left side of the figure schematically shows the drive roller 22 viewed from the right side X2. Also, similarly to the above, the case in which there is a shift in the axial direction of the rotational shaft of the drive roller 22 is assumed, and such a case of disposition is shown that the rotational shaft of the drive roller 22 is shifted to the right side X2 on the rear side Y2 and is shifted to the left side X1 on the front side Y1, for example.

As shown on the right side in FIG. 8, the pressure roller 24 is disposed at the downstream end in the contact region $\alpha$ and provided so that the outer surface of the intermediate transfer belt 21 is wound around the outer surface of the pressure roller 24 at a predetermined winding angle $\theta$. The pressure roller 24 is provided in contact so as to press the outer surface of the intermediate transfer belt 21.

When considering the minute length corresponding to the winding angle $\theta$ of the intermediate transfer belt 21, at the base point P5, the force component F5 acts on the intermediate transfer belt 21 in the radial direction of the pressure roller 24. Therefore, as shown on the left side of FIG. 8, in an upstream-side region A1 in the rotating direction C of the intermediate transfer belt 21 relative to the rotating direction D of drive roller 22, the frictional force by the force components F1 and F2 acts with inclination to the front side Y1 direction, while in a downstream-side region A2, the frictional force by the force components F3 to F5 acts with inclination to the rear side Y2 direction. In other words, in the configuration with the pressure roller 24 shown in FIG. 8 as opposed to the configuration without the pressure roller 24 shown in FIG. 7, the frictional force $\mu$F5 by the force component F5 further acts on the intermediate transfer belt 21.

The intermediate transfer belt device 20 can increase the frictional force in the downstream-side region A2 with the force component F5 added to the force components F3, F4 in the downstream-side region A2 by including the pressure roller 24 as above even if the rotational shaft of the drive roller 22 is shifted in the axial direction. Therefore, the frictional force in the direction (in this case, the rear side Y2 direction) opposite to the bias direction (in this case, the front side Y1 direction) that can occur in the intermediate transfer belt 21 on the drive roller 22 can be increased. That is, in this case, the frictional force in the downstream-side region A2 can resist the bias in the front side Y1 directional caused by the frictional force in the upstream-side region A1, offset the influence thereof by the frictional force generated in the opposite direction, and reduce the bias amount.

The winding angle $\theta$ of the intermediate transfer belt 21 with respect to the pressure roller 24 is preferably within 90 degrees. That is because, if the winding angle $\theta$ exceeds 90 degrees, the force component F5 in the radial direction generated by the pressure roller 24 cannot be caused to act as a frictional force in the direction opposite to the bias direction in the upstream-side region A1, and the effect of the pressure roller 24 is considered to be reduced. By providing the intermediate transfer belt 21 with the winding angle $\theta$ to the pressure roller 24 within 90 degrees, in the case shown in FIG. 8, the bias generated in the front side Y1 direction of the intermediate transfer belt 21 can be pulled back to the rear side Y2 direction, which is the opposite direction, and the bias of the intermediate transfer belt 21 generated as a whole can be kept small.

Moreover, there have been such problems that a grip on the intermediate transfer belt 21 is lowered, and the influence of the mounting angle and outer diameter tolerance of the drive roller 22 becomes much larger by having the drive roller 22 with a reduced diameter, but by providing the pressure roller 24, the bias generated in the intermediate transfer belt 21 can be reduced as described above. Therefore, the meandering of the intermediate transfer belt 21 can be effectively suppressed, and a load on the meandering correction mechanism can be also alleviated.

As a more specific configuration of the pressure roller 24, for example, a coating layer 242 made of an elastic member is preferably provided on the outer peripheral surface of a cylindrical metal core material. The coating layer 242 is provided so as to have a uniform thickness over the entire circumference of the pressure roller 24, and an elastic member constituting this coating layer 242 is preferably made of a rubber-based material such as EPDM (ethylene propylene diene rubber), for example.

Figure 9:
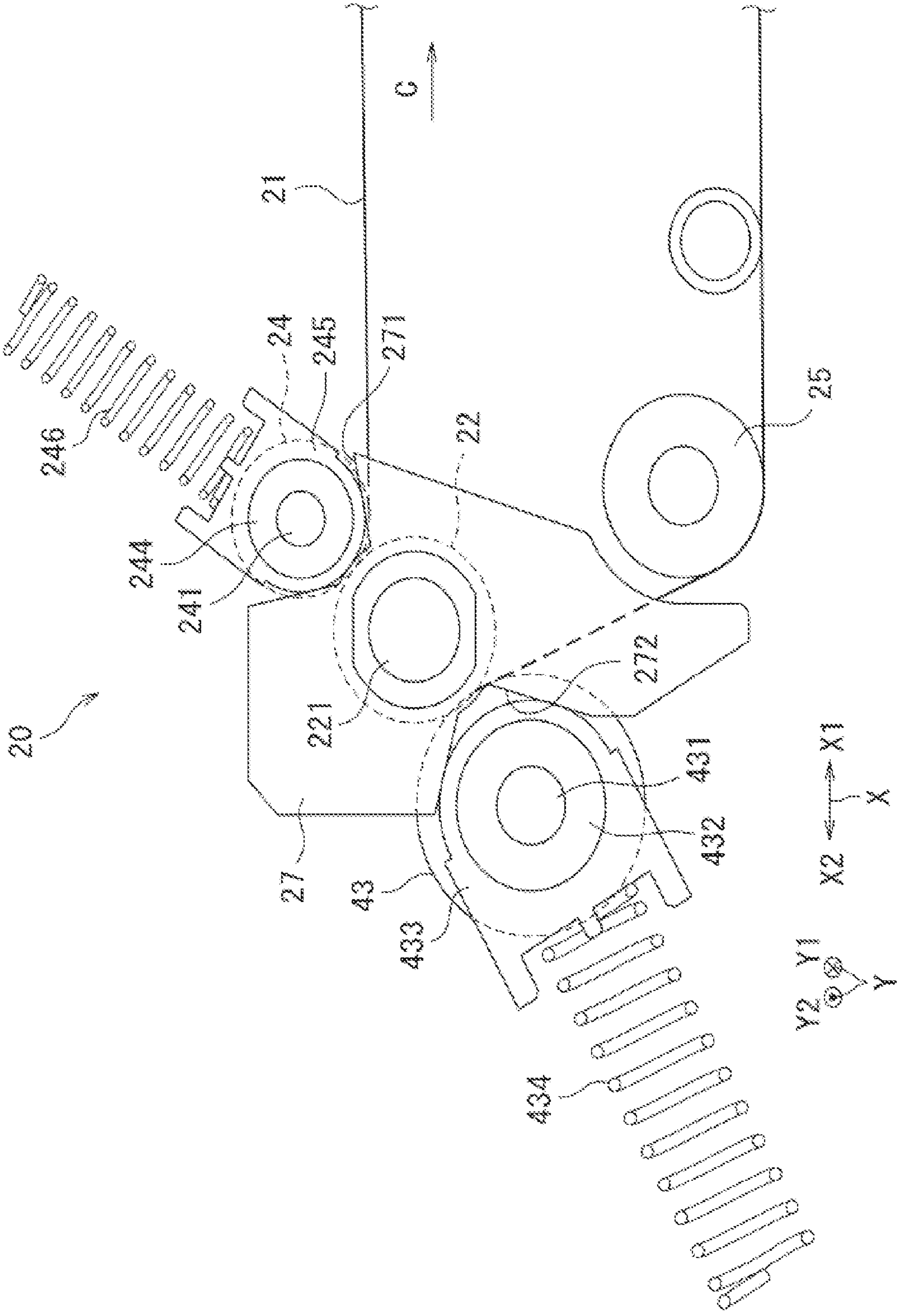
FIG. 9 is an enlarged explanatory diagram illustrating a support structure of a pressure roller provided in the intermediate transfer belt device.
Figure 10:
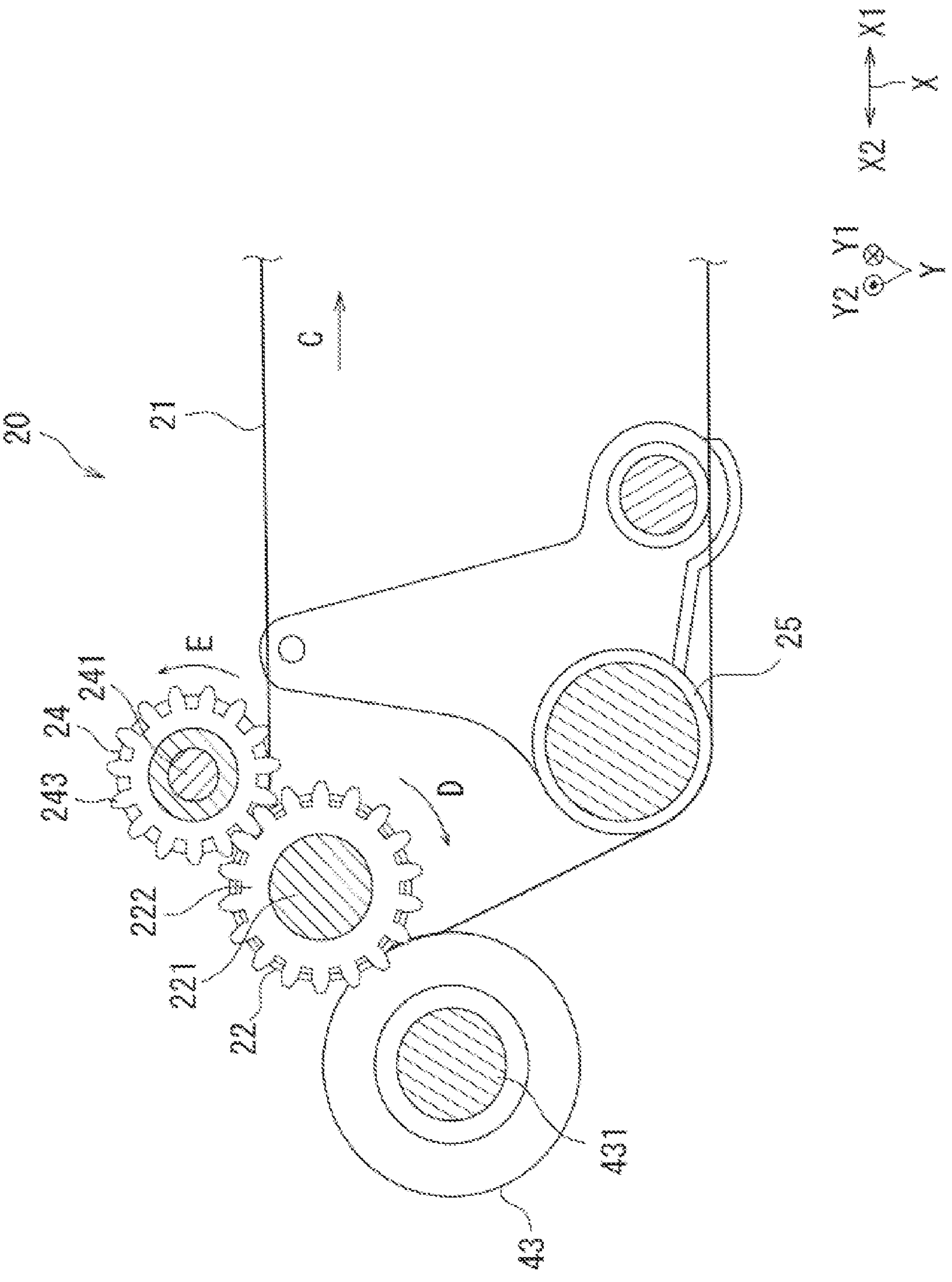
FIG. 10 is an enlarged explanatory diagram illustrating a drive mechanism of the pressure roller.

FIG. 9 is an enlarged explanatory diagram illustrating the support structure of the pressure roller 24, and FIG. 10 is an enlarged explanatory diagram illustrating a drive mechanism of the pressure roller 24. FIG. 9 and FIG. 10 schematically illustrate the configuration of the right side X2 part in the intermediate transfer belt device 20 viewed from the rear side Y2.

As shown in FIG. 9, in the intermediate transfer belt device 20, the drive roller 22 has its rotational shaft 221 rotatably supported by a support member 27. The support member 27 is supported by the main-body side frame and the like described above.

The pressure roller 24 has a bearing 244 of a rotational shaft 241 held in a bearing holder 245. The secondary transfer roller 43 similarly has a bearing 432 of its rotational shaft 431 held in a bearing holder 433. Both the pressure roller 24 and the secondary transfer roller 43 are positioned by being opposed to the drive roller 22. The pressure roller 24 has a bias member (spring member) 246 that biases in a direction pressed onto the drive roller 22 provided in the bearing holder 245. The secondary transfer roller 43 also has a bias member 434 that biases in a direction pressed onto the drive roller 22 provided in the bearing holder 433. As a result, the pressure roller 24 and the secondary transfer roller 43 are provided by being biased toward the drive roller 22.

The support member 27 has a first bearing engager 271 engaged with the bearing holder 245 of the pressure roller 24 provided so that the rotational shaft 241 of the pressure roller 24 is parallel to the rotational shaft 221 of the drive roller 22. As shown in FIG. 9, the first bearing engager 271 is formed so as to support the bearing holder 245 by partially cutting out an upper end part of the support member 27.

The support member 27 also has a second bearing engager 272 engaged with the bearing holder 433 of the secondary transfer roller 43 provided. The second bearing engager 272 is formed so as to support the bearing holder 433 by partially cutting out a side part of the support member 27 in a disposition form opposed to the first bearing engager 271. As a result, the rotational shaft 241 of the pressure roller 24 and the rotational shaft 431 of the secondary transfer roller 43 are positioned in parallel with each other and stably supported with respect to the rotational shaft 221 of the drive roller 22, which is rotatably supported by the support member 27.

As shown in FIG. 10, the pressure roller 24 may also be configured to be driven to rotate via a gear 243. The drive roller 22 is driven to rotate in the rotating direction D by a driving force transmitted to the rotational shaft 221 via the gear 222. In contrast, the pressure roller 24 includes a gear 243 that meshes with the gear 222 of the drive roller 22 and is driven to rotate in a rotating direction E by the driving force transmitted to the rotational shaft 241 via this gear 243. As a result, the pressure roller 24 can be rotated without slipping and can be effectively caused to act on the intermediate transfer belt 21.

In addition, a gear ratio of these gears 222 and 243 and the outer diameters of the pressure roller 24 and the drive roller 22 are preferably set so that the rotation speed of the pressure roller 24 is faster than the rotation speed of the drive roller 22. As a result, the pressure roller 24 can be driven to rotate faster than the drive roller 22 at a predetermined speed difference with respect to the drive roller 22 and caused to act more effectively to suppress bias of the intermediate transfer belt 21. The speed difference between the rotation speed of the pressure roller 24 and the rotation speed of the drive roller 22 can be adjusted as appropriate and can be caused to act so as to sufficiently suppress the bias even if it is a slight difference of approximately 0.2 to 1%.

In the intermediate transfer belt device 20 configured as above, even if the drive roller 22 with a reduced diameter is provided, because of the provision of the pressure roller 24, it can rotate the intermediate transfer belt 21 without slipping, and even if there is a misalignment of the rotational shaft 221 of the drive roller 22, the pressure roller 24 can be caused to act to reduce the bias generated in the intermediate transfer belt 21. Therefore, the meandering of the intermediate transfer belt 21 can be effectively suppressed, and a load on the meandering correction mechanism can be also alleviated.

In the aforementioned embodiment, the pressure roller 24 is not limited to the configuration including the gear 243, but may also be configured such that the outer surface of the intermediate transfer belt 21 is provided to be wound around and to rotate by frictional force between it and the intermediate transfer belt 21. Any other forms may be taken as long as it is configured such that the pressure roller 24 is disposed at a position corresponding to the downstream end in the rotating direction C of the intermediate transfer belt 21 in the contact region $\alpha$ between the intermediate transfer belt 21 and the drive roller 22, and the intermediate transfer belt 21 is provided to be wound around the pressure roller 24 at the winding angle $\theta$ within 90 degrees.

The image forming apparatus 1 including the intermediate transfer belt device 20 as described above is not limited to the multifunctional machine shown in FIG. 1, but can be applied to a variety of image forming apparatuses. The embodiments disclosed above are in all respects exemplifications and are not intended to be a basis for limiting interpretation. Therefore, the technical scope of the present disclosure is not construed only by the embodiments described above but defined on the basis of recitation in the claims. Furthermore, any changes within the meaning and range equivalent to the claims fall within the scope of the claims.

What is claimed is:

1. An image forming apparatus, comprising:

an intermediate transfer belt on which a toner image is formed;

a drive roller that is disposed in contact with an inner surface of the intermediate transfer belt wound around the drive roller, and that rotates the intermediate transfer belt in a predetermined direction;

a pressure member that presses the intermediate transfer belt from an outer surface of the intermediate transfer belt toward the drive roller; and a transfer member that is disposed in contact with the intermediate transfer belt upstream of the pressure member in a rotating direction of the intermediate transfer belt, and that transfers the toner image formed on the intermediate transfer belt to a sheet, wherein the pressure member is disposed at a position corresponding to a downstream end in the rotating direction of the intermediate transfer belt in a contact region where the intermediate transfer belt and the drive roller come into contact with each other, the intermediate transfer belt is provided in contact with the pressure member, such that the outer surface of the intermediate transfer belt is wound around an outer surface of the pressure member at a predetermined winding angle, the pressure member is a roller member and is driven to rotate through a drive gear, and the pressure member generates a frictional force to move the intermediate transfer belt in a direction opposite a bias direction in the contact region.

2. The image forming apparatus according to claim 1, wherein a winding angle of the intermediate transfer belt to the pressure member is equal to or less than 90 degrees.

3. The image forming apparatus according to claim 1, wherein the pressure member is driven to rotate faster than the drive roller by a predetermined speed difference relative to the drive roller.

4. The image forming apparatus according to claim 3, wherein the drive roller is rotatably supported by a support member, and in the support member, a bearing engager that engages with a bearing of the pressure member is provided, such that a rotational shaft of the pressure member and a rotational shaft of the drive roller are parallel to each other.

5. The image forming apparatus according to claim 1, wherein the pressure member has a cylindrical metal core material and a coating layer made of an elastic member provided on an outer peripheral surface of the cylindrical metal core material.

* * * * *